United States Patent
Shaham et al.

(10) Patent No.: US 9,440,381 B1
(45) Date of Patent: Sep. 13, 2016

(54) MANUALLY OPERATED TABLET PRESS

(71) Applicants: Kamal Shaham, Stratford, CT (US); James Shaham, Stratford, CT (US)

(72) Inventors: Kamal Shaham, Stratford, CT (US); James Shaham, Stratford, CT (US)

(*) Notice: Subject to any disclaimer, the term of this patent is extended or adjusted under 35 U.S.C. 154(b) by 0 days.

(21) Appl. No.: 14/737,667

(22) Filed: Jun. 12, 2015

(51) Int. Cl.
  *B29C 43/36* (2006.01)
  *B29C 43/00* (2006.01)
  *B29L 31/00* (2006.01)

(52) U.S. Cl.
  CPC ............ *B29C 43/006* (2013.01); *B29C 43/36* (2013.01); *B29C 2043/3639* (2013.01); *B29L 2031/757* (2013.01)

(58) Field of Classification Search
  CPC ..... B29C 43/02; B29C 43/36; B29C 43/361; B29C 2043/3639
  USPC ........................................................ 425/352
  See application file for complete search history.

(56) References Cited

U.S. PATENT DOCUMENTS

| | | | | |
|---|---|---|---|---|
| 1,344,091 A | * | 6/1920 | Schoenkerman | B30B 11/04 425/195 |
| 2,181,618 A | * | 11/1939 | Bole et al. | 425/422 |
| 3,920,368 A | * | 11/1975 | Lemelson | A63H 33/001 425/195 |
| 8,343,533 B2 | * | 1/2013 | Chen | A61K 9/0056 424/440 |
| 2002/0039603 A1 | * | 4/2002 | Gereg | B30B 11/02 425/193 |
| 2003/0031744 A1 | * | 2/2003 | Cecil | B30B 11/08 425/107 |
| 2004/0028765 A1 | * | 2/2004 | Kerzner | A61J 3/10 425/167 |
| 2005/0098915 A1 | * | 5/2005 | Long | B29C 43/003 264/109 |
| 2011/0187016 A1 | * | 8/2011 | Gulliver | B30B 15/028 264/109 |

* cited by examiner

*Primary Examiner* — James Mackey
(74) *Attorney, Agent, or Firm* — Barry Choobin; Patent 360

(57) ABSTRACT

A manually operated tablet press is provided. The manually operated tablet press includes a plurality of components that can be arranged into a stored configuration and into an operable configuration, whereby a user can produce a user-tailored dose or the combination of doses in the operable configuration, and wherein practical arrangement of the tablet press facilitates efficient reprocessing thereof. The tablet press provides a die, a press and a die-press interface for forming a user-tailored dose tablet pill wherein said components are practically arranged to use, reprocess and store.

5 Claims, 4 Drawing Sheets

MANUALLY OPERATED TABLET PRESS

BACKGROUND OF THE INVENTION

The present invention relates to tablet press machines and, more particularly, to a manually operated tablet press At present, tablets, especially tablets used in the pharmaceutical field, are made by compressing a powder or granular product under high pressure. This operation is performed by machines design to produce a high quantity of tablets for a general population, as opposed to making tablets specifically tailored for a predetermined dose, or a combination of doses for different granular products.

Current manually operated tablet presses are difficult to clean because of an impractical arrangement of parts, whereby a user pours a tablet powder into a hard-to-reach and thus hard-to-clean powder-holding cavity. Since the improper mixing of pharmaceuticals can have fatal consequences, reprocessing (cleaning) of the residual tablet powder is a must, making the ease of reprocessing the residual tablet powder a useful improvement in the technical field.

As can be seen, there is a need for a manually operated tablet press whereby a user can produce a user-tailored dose or the combination of doses, and wherein reprocessing is made easy by the practical arrangement of the powder-holding cavity and other components.

SUMMARY OF THE INVENTION

In one aspect of the present invention, a manually operated tablet press for forming a tablet comprising a user-tailored dose of a loose tablet material includes a base; a die post terminating in a distal die end protruding above the base; a press extending from a first press end to a distal press end; and a die-press interface forming a housing hole, wherein the housing hole extends from a first interface end to an opposing second end of the die-press interface.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a manually operated tablet press including a plurality of components that can be arranged into a stored configuration and into an operable configuration, whereby a user can produce a user-tailored dose or the combination of doses in the operable configuration, and wherein practical arrangement of the tablet press facilitates efficient reprocessing thereof. The tablet press provides a die, a press and a die-press interface for forming a user-tailored dose tablet pill wherein said components are practically arranged to use, reprocess and store.

Figure 1:
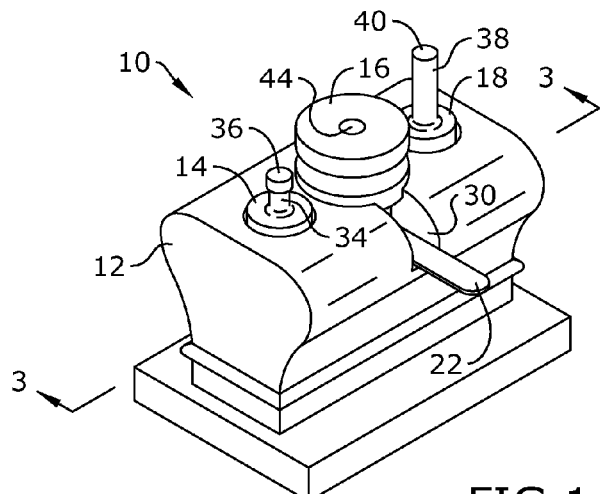
FIG. 1 is a perspective view on an exemplary embodiment of the present invention, illustrating in a stored configuration.
Figure 2:
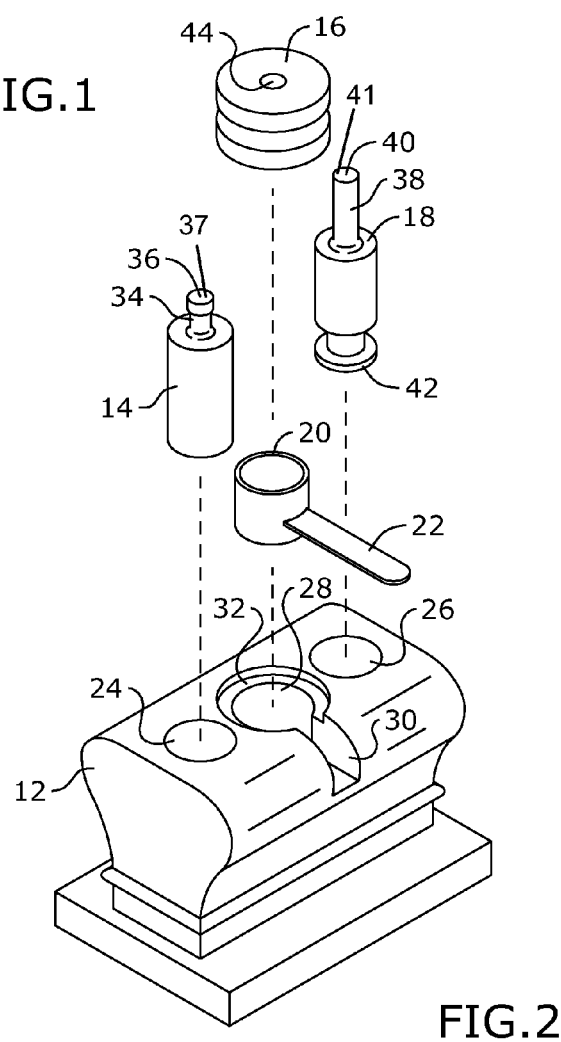
FIG. 2 is an exploded view on an exemplary embodiment of the present invention.
Figure 3:
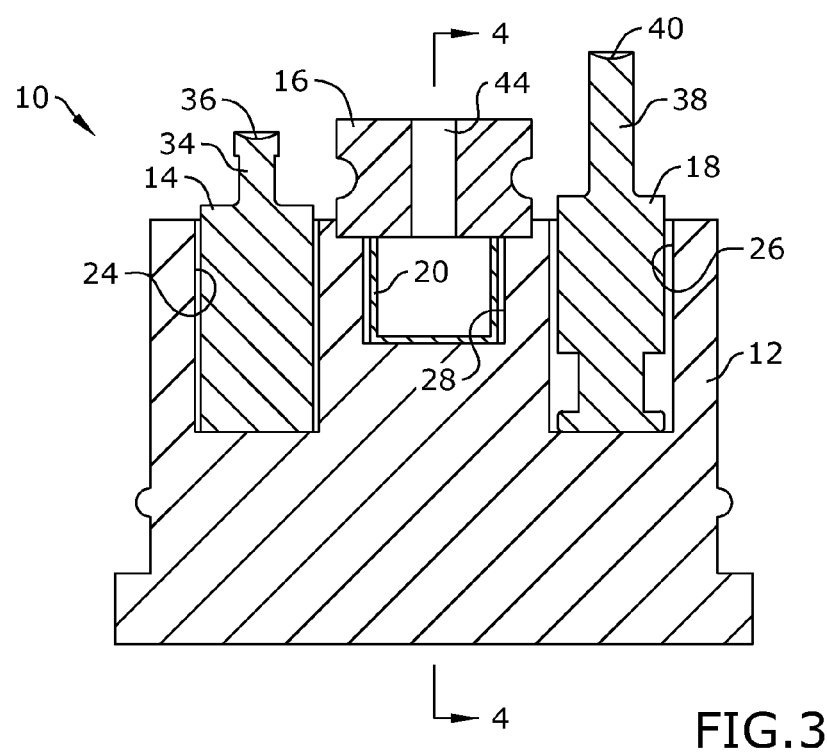
FIG. 3 is a section view on an exemplary embodiment of the present invention, taken along line 3-3 in FIG. 1.
Figure 4:
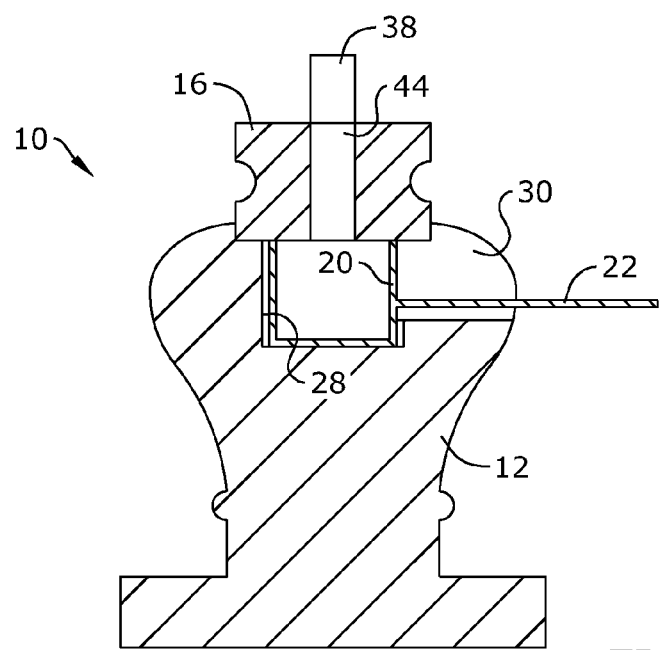
FIG. 4 is a section view on an exemplary embodiment of the present invention, taken along line 4-4 in FIG. 3.

Referring to FIGS. 1 through 8, the present invention provides a manually operated tablet press 10. The tablet press 10 may include a base 12, a die 14, a press 18, a die-press interface 16, and a pill catcher 20. The base 12 may be made of any suitably hard material including but not limited to hard wood, metal, plasticized material or the like. The base 12 may form a die cavity 24, a press cavity 26, and a catcher cavity 28, each cavity dimensioned to slidably receive the die 14, the press 18, and the pill catcher 20, respectively. The pill catcher cavity 28 may further form a catcher handle cavity 30 dimensioned and adapted to slidably receive a handle 22 of the pill catcher 20. The base 12 may further form a recessed die-press interface cavity 32 along a periphery of the pill catcher cavity 28, providing a flange dimensioned to slidably receive a portion of the die-press interface 16. The tablet press 10 may be arranged in a stored configuration where the die 14, the press 18, the die-press interface 16, and the pill catcher 20 are stored in their relevant cavities, as illustrated in FIGS. 1 and 3.

The die 14 can be substantially cylindrical, oval, square, triangular or other geometric shape extending from a first die end to a second die end. The die 14 may include a die post 34 that extends from the second die end generally along a shared longitudinal axis of the die 14, terminating in a die distal end 36. The die distal end 36 may form a curved die indent 37 dimensioned and adapted for shaping a tablet pill 50 from a loose pill material 48.

The press 18 can be substantially cylindrical, oval, square, triangular or other geometric shape extending from a first press end 42 to a second press end. The press 18 may include a press post 38 that extends from the second press end generally along a shared longitudinal axis of the press 18, terminating in a press distal end 40. The press distal end 40 may form a curved press indent 41 adapted for shaping the tablet 50 from the loose pill material 48. The first press end 42 may form a mallet portion adapted to facilitate an application of compression force. Both distal end indents, die 37 and press 41, may form cooperating curved indents.

The die distal end 36 and the press distal end 40 may have substantially similar peripheral profiles (such as a substantially similar circumference if both posts 34, 38 were cylindrical) so that when aligned and abutting, said peripheral profiles are shared by the distal ends 36, 40.

Figure 6:
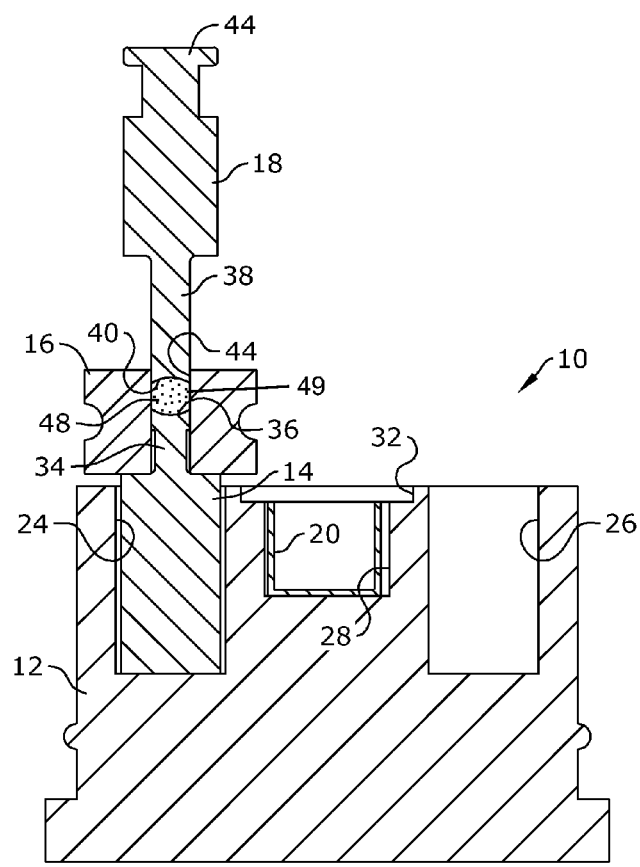
FIG. 6 is a section view on an exemplary embodiment of the present invention, taken along line 6-6 in FIG. 5, illustrating the operable configuration.
Figure 7:
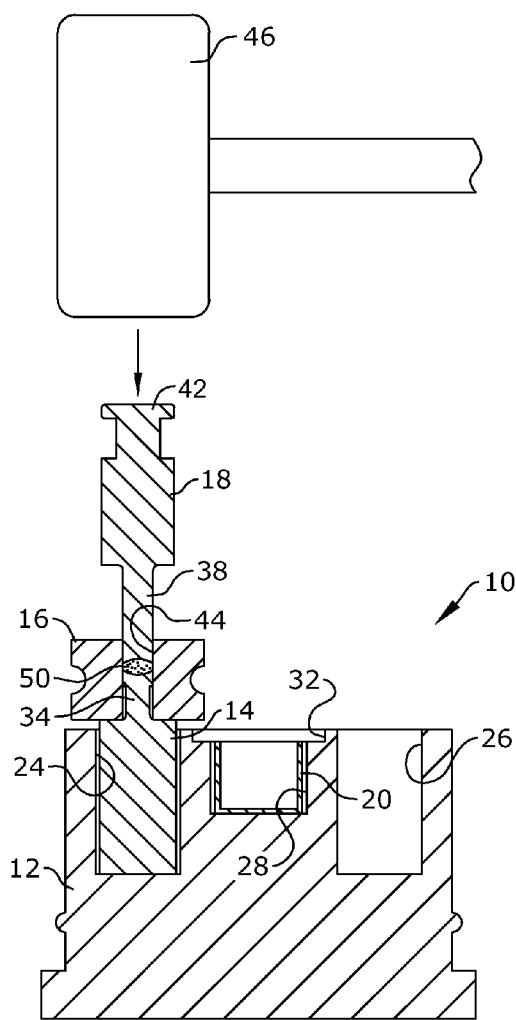
FIG. 7 is a section view on an exemplary embodiment of the present invention, illustrating compression of a tablet pill.
Figure 8:
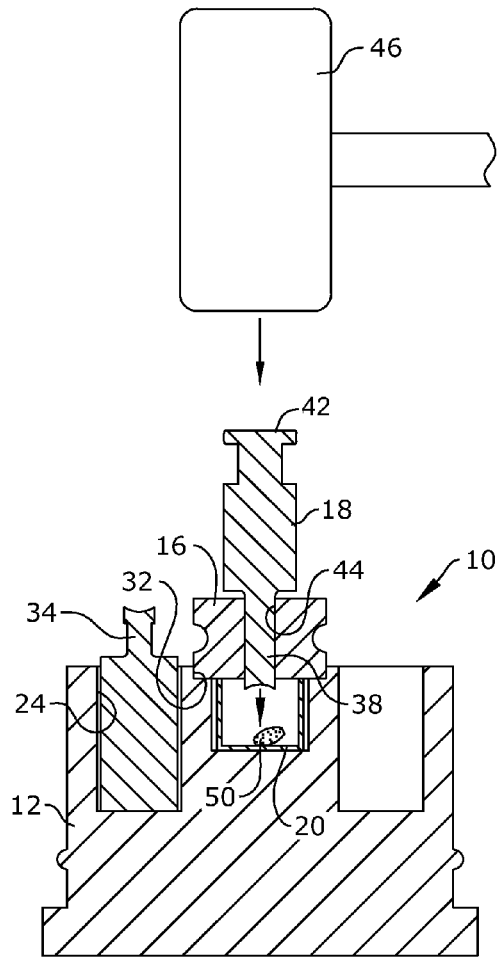
FIG. 8 is a section view on an exemplary embodiment of the present invention, illustrating an ejection of the tablet pill into a pill catcher.

The die-press interface 16 may form a housing hole 44 extending between opposing sides of the die-press interface 16. The housing hole 44 may be dimensioned and adapted to slidably receive the die post 34 and the press post 38 from opposing sides, respectively, as illustrated in FIGS. 6 and 7.

Figure 5:
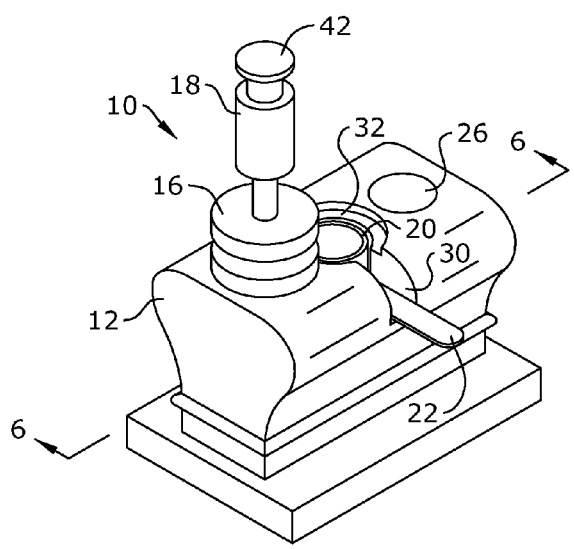
FIG. 5 is a perspective view on an exemplary embodiment of the present invention, illustrating an operable configuration.

The method of using the present invention may include the following. The tablet press 10 disclosed above may be provided. A user may place the die 14, first-die-end first, into the die cavity 24 so that the die post 34 protrudes from the die cavity 24. Then the user may slide the housing hole 44 unto the die post 34, whereby the die post 34 occupies a minority portion of the housing hole 44, forming a temporary pill forming cavity 49. Then the user may partially fill a remaining portion of the housing hole 44 with a predetermined amount of loose pill material 48 that piles onto the upward facing curved die indent 37, i.e., temporary pill forming cavity 49. The loose pill material 48 may include a predetermined dosage of at least one powered pharmaceutical. Then the user may arrange the tablet press 10 in an operable configuration by sliding the press post 38 through the opposing side of the housing hole 44, as illustrated in FIG. 5, so as to sandwich the loose pill material 48 between the curved indents 37, 41, forming a generally tablet-shaped pill forming cavity 49, as illustrated in FIG. 6. Then the user may use a mallet 46 to compress the tablet-shaped loose pill material 48 to form the tablet pill 50 as shown in FIG. 7.

The present invention is adapted so that the compressed pill 50 may stick to the downward-facing curved press indent 41, as a result of the above-mentioned formation. In order to eject the pill 50, the user may position the die-press interface 16 in the recessed die-press interface cavity 32, over the pill catcher 20, slide the curved press indent 41/pill 50 into the housing hole 44, and strike the mallet 46 against the mallet portion 42 so as to jar the pill 50 into the pill catcher 20.

Subsequent use, the user may practically disassemble the temporary pill forming cavity 49 so as to reprocess/clean the residual loose pill material 48 from its respective components, the die 14, the press 18 and the housing hole 44. Once reprocessed, the tablet press 10 may be efficiently arranged in the stored configuration for future use.

It should be understood, of course, that the foregoing relates to exemplary embodiments of the invention and that modifications may be made without departing from the spirit and scope of the invention as set forth in the following claims.

What is claimed is:

1. A manually operated tablet press for forming a tablet comprising a user-tailored dose of a loose pill material, comprising:

a base comprising a die cavity, a press cavity, and a pill catcher cavity, wherein the die cavity is configured to receive a die, and the press cavity is configured to receive a press;

a die-press interface of generally cylindrical shape, wherein the die-press interface is configured to be positioned in a die-press interface cavity defined along a periphery of the pill catcher cavity, wherein the die-press interface comprises a housing hole;

the die positioned within the die cavity, wherein a die post protrudes outwardly from the die cavity, wherein the die-press interface is positioned via slidably receiving the housing hole along the die post;

a press post extending along a longitudinal axis of the press, wherein the press post is slid through an opposing side of the housing hole to sandwich the loose pill material between distal curved indents of the die post and the press post to form a temporary pill forming cavity, wherein a mallet is used to compress the tablet-shaped loose pill material to form the tablet; and wherein the temporary pill forming cavity is disassembled by removing the die and the press from the housing hole thereby residual loose pill material is cleaned, and fresh loose pill material is reprocessed into the temporary pill forming cavity.

2. The manually operating tablet press of claim 1, wherein the die is positioned into the die cavity to allow the die post to be protruded from the die cavity, wherein the housing hole of the die-press interface is slid onto the die post, whereby the die post occupies a portion of the housing hole to form the temporary pill forming cavity.

3. The manually operated tablet press of claim 1, wherein the distal curved indents of the die post and the press post form cooperating curved indents.

4. The manually operated tablet press of claim 1, wherein the pill catcher cavity is configured to receive a pill catcher, wherein the pill catcher cavity further comprises a catcher handle cavity dimensioned and adapted to slidably receive a handle of the pill catcher.

5. The manually operated tablet press of claim 4, wherein the pill catcher is dimensioned to operatively slide into the pill catcher cavity, wherein the die-press interface is positioned in the recessed die-press interface cavity to receive the ejected tablet compressed by the mallet.

* * * * *